United States Patent [19]

Pinson et al.

[11] Patent Number: 4,656,349

[45] Date of Patent: Apr. 7, 1987

[54] OPTICAL SCANNING DEVICE FOR A MISSILE AND THE LIKE

[75] Inventors: George T. Pinson; Ralph R. Reinhold; Roland L. Finley, all of Huntsville, Ala.

[73] Assignee: The Boeing Company, Seattle, Wash.

[21] Appl. No.: 671,414

[22] Filed: Nov. 14, 1984

[51] Int. Cl.$^4$ ................................................. G01J 1/20
[52] U.S. Cl. ................................. 250/203 R; 250/234
[58] Field of Search .................. 244/3.16; 250/203 R, 250/234, 235; 350/6.5, 6.6

[56] References Cited

U.S. PATENT DOCUMENTS

| 3,946,233 | 3/1976 | Erben et al. | 250/203 R X |
| 4,030,807 | 6/1977 | Briney | 250/203 R X |
| 4,538,880 | 9/1985 | Reinhold | 350/6.6 |

*Primary Examiner*—Eugene R. LaRoche
*Assistant Examiner*—James C. Lee

[57] ABSTRACT

An optical scanning device for mounting in a missile and the like and used for searching for a target. The device is computer controlled with the scanning of the target accomplished with low energy expenditure and great rapidity with uninhibited scanning patterns.

3 Claims, 10 Drawing Figures

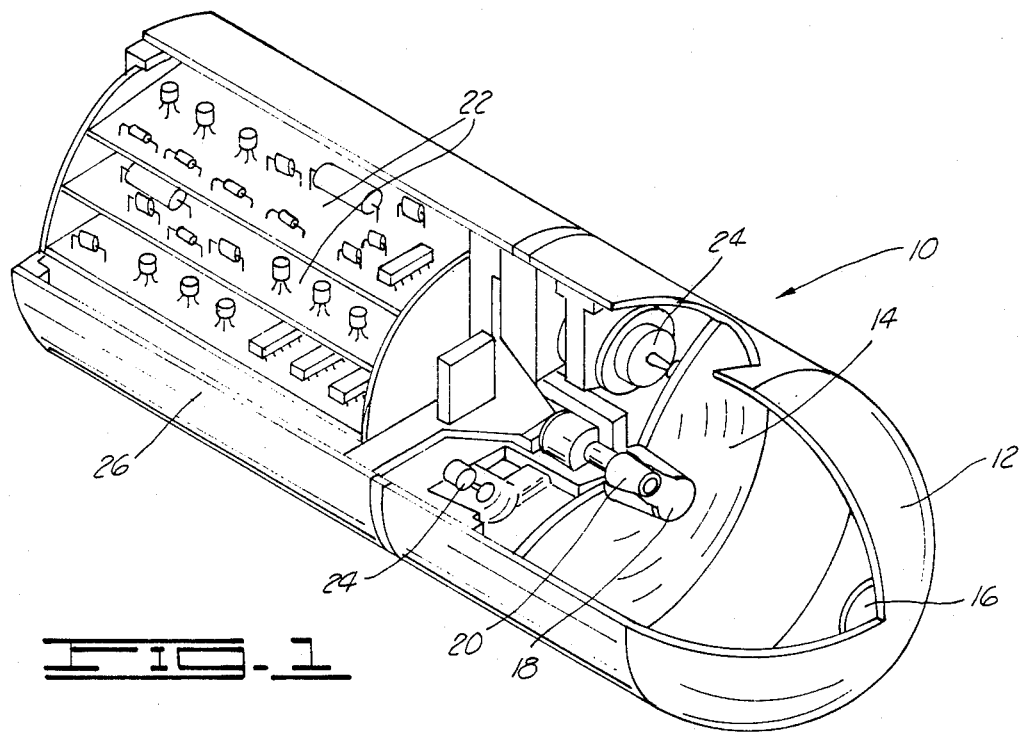
FIG-1
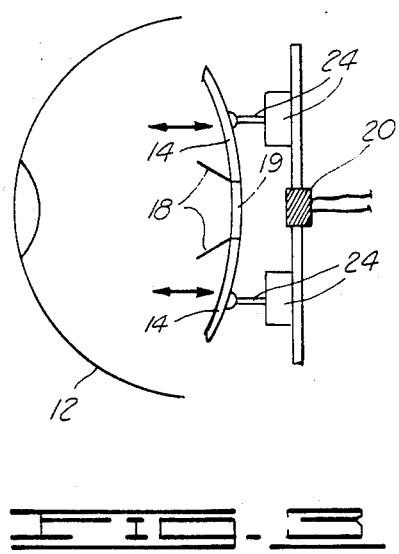
FIG-3
FIG-4

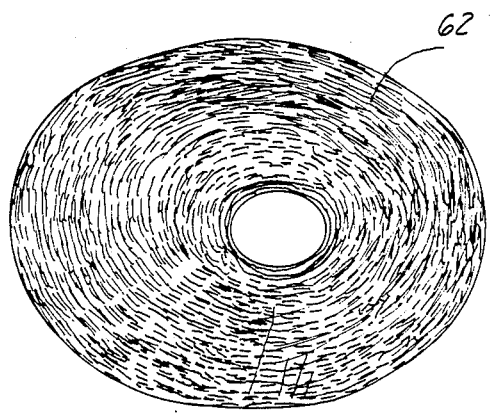
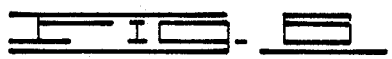
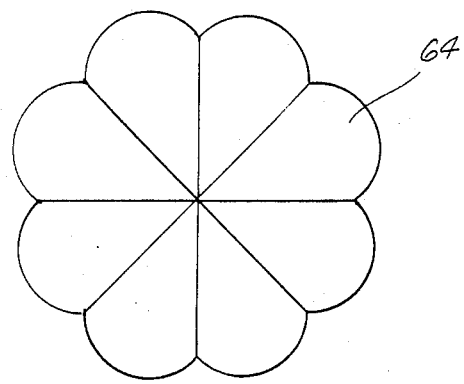
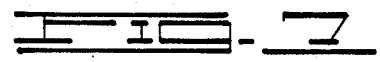
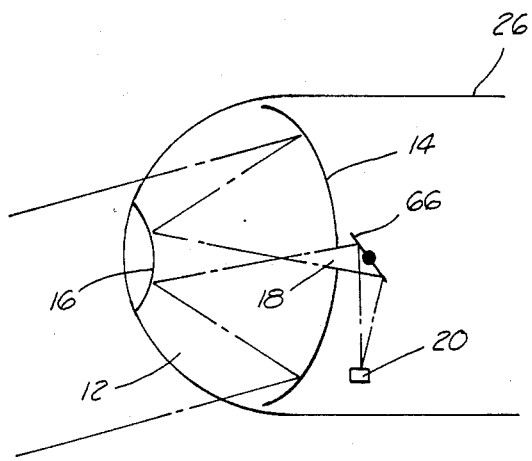
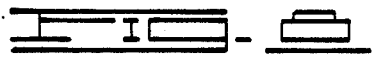
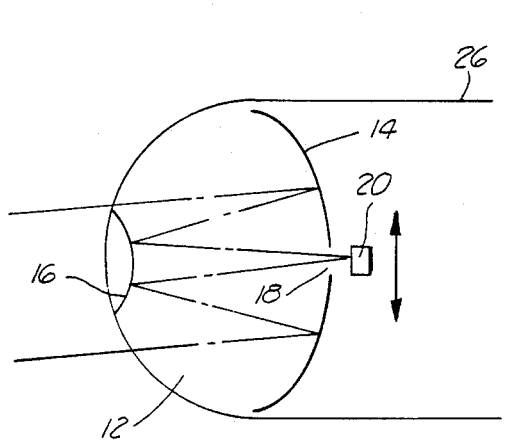
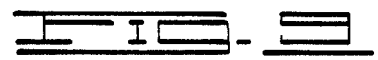
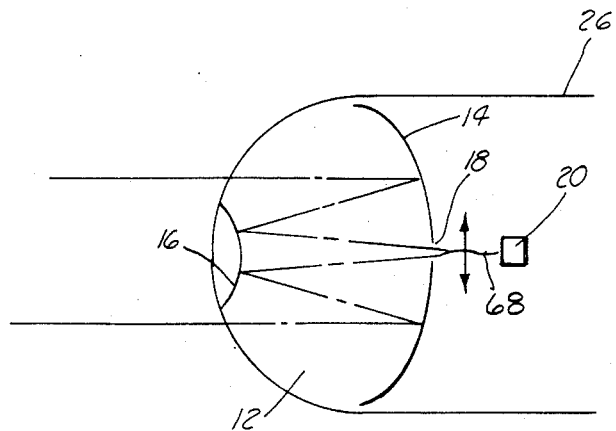

OPTICAL SCANNING DEVICE FOR A MISSILE AND THE LIKE

BACKGROUND OF THE INVENTION

This invention relates to a scanning device and more particularly but not by way of limitation to an optical scanning device for mounting on a missile and the like.

Heretofore, homing guided missiles were highly complex mechanisms which led to manufacturing difficulty and requiring skilled labor at great expense. The most complex component of a homing missile is the seeker. Therefore, it follows that a simpler seeker mechanisim will reduce missile manufacturing costs and lead to ease of manufacture, higher reliability with additional benefits.

A variety of techniques exist for designing seekers which included self-stabilized gyro tracking heads and rate or position stabilization platforms. In recent years, small missiles with seekers working in optical or infrared bands have mounted the seeker optics on the rotor of a gyroscope. This provides a stable platform on which to operate but it severely inhibits the seeker due to space requirements which are limited for the essential seeker mechanism. Further, the scan freedom is limited by the necessity of torquing a gyro to change the position of field of view. Also there is difficulty in extracting signal energy from a rotating gyro. Further, it is difficult to provide a mechanical design of the gyro which survives missile launch acceleration. Attempts to overcome these problems have included the building of larger gyros to allow for more space, providing multiple detectors to reduce scanning requirements, using fiber optics to provide a flexible means of coupling energy and designing compliant bearings to survive launch accelerations. The above mentioned problems and difficulties are solved by the subject invention as described herein. In the following U.S. patents, U.S. Pat. No. 4,030,807 to Briney, U.S. Pat. No. 4,029,246 to Voight, U.S. Pat. No. 4,087,061 to Burt, U.S. Pat. No. 4,275,949 to Jones, U.S. Pat. No. 4,413,177 to Godwin, Jr., et al, U.S. Pat. No. 4,427,878 to Buchtel et al and U.S. Pat. No. 4,435,260 to Donelan various types of optical scanning apparatus are described for use with gyro systems. None of these above mentioned scanning and seeking devices provide the unique features and advantages of the subject invention.

SUMMARY OF THE INVENTION

The subject optical scanning device separates optics from a gyro or rate sensors and/or accelerometers and minimizes the mass required for a desired scanning mechanism. The invention dynamically alters the alignment of one reflector by the use of linear actuators which are under computer control. The reflector may be of extremely low mass compared to a typical gyroscope.

The computer controlled scanning device provides scanning with relatively low energy expenditure and with great rapidity and patterns which were inhibited by gyro momentum constraints.

The optical scanning device provides for an arrangement of optical elements which permits wide angle beam scanning.

The optical scanning device is strapdown in the sense that is not coupled mechanically directly to a stabilizing element. Instead rate of change and/or position and orientation information is obtained from remote rate sensors and/or accelerometers or gyros which may be located in the carrier missile. The data from these remote orientation/position/rate sensing devices is transferred into the proper frame of reference and used in the scanning algorithm to stabilize the optical scanning device relative to the search area and the target being tracked.

The optical scanning device for a missile and the like used in searching targets includes a dome mounted on the missile for receiving the target signal therethrough. The signal is collected on a primary reflector where it is reflected onto a secondary reflector. The reflected signal is then received by a detector and amplified and refiltered by computer process electronics. The primary reflector is moved by one or more actuators to control the beam sensing direction.

The advantage and objects of the invention will become evident from the following detailed description of the drawings when read in conjunction with the accompanying drawings which illustrate preferred embodiments of the invention.

BRIEF DESCRIPTION OF THE DRAWINGS

FIG. 1 illustrates a perspective view of the optical scanning device mounted on a missile.

FIG. 4 illustrates the signal ray reflection on the primary and secondary reflectors.

FIG. 5 illustrates the computer control of the scanning device.

FIGS. 6 and 7 illustrate typical search and scan patterns.

FIG. 8 illustrates an alternate embodiment with a tertiary reflector.

FIGS. 9 and 10 illustrate alternate embodiments of a movable detector.

DETAILED DESCRIPTION OF THE DRAWINGS

Figure 2:
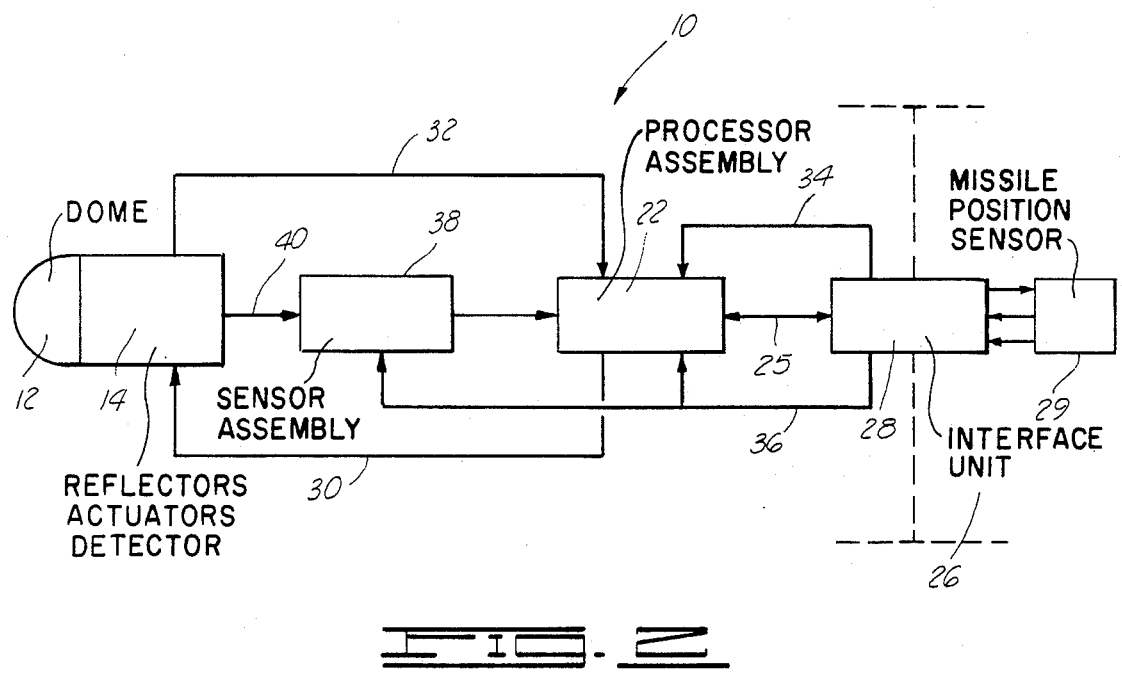
FIG. 2 illustrates a block diagram of the scanning device.

In FIG. 1 the optical scanning device for mounting on a missile or the like for searching a target is designated by general reference numeral 10. The device 10 includes a dome 12 used for protecting the optical, sensor and electronic elements from the atmosphere. A primary reflector 14 reflects and focuses the signal onto a secondary reflector 16. The signal is then received through a light shield 18 in an opening 19 in the primary reflector 14 and focused onto a detector 20. The signal is then amplified and filtered by a computer controlled electronics processor assembly 22. The primary reflector 14 is controlled and moved by a plurality of linear actuators 24 which move the reflector 14 to compensate for missile motion using gyro, rate sensor and/or accelometer date and to move in a desired scanning pattern for searching and locating the target and for tracking the target while the missile is maneuvering. The missile is shown having reference numeral 26.

In FIG. 2 a functional block diagram of the device 10 is shown. As mentioned, the target signal is received through the dome 12 and collected by the primary and secondary reflectors 14 and 16 where it is reflected onto the detector 20 and amplified and filtered by the electronics processor assembly 22. Target location directional data indicated by arrow 25 is then passed to the missile 26 through an interface unit 28 where it is utilized to control the missile 26 in intercepting the target. A rate sensor, gyro or accelometer 29 provides missile position, orientation and rate data to the interface unit 28 where necessary coordinate transpositions are made to define target or search area positions relative to the missile frame of reference. This information is fed to the electronic processor assembly 22 for use in defining feedback optical control requirements. The processor assembly 22 feeds back optical control to the actuators 24 via lead 30. The optics position is fed to the assembly 22 via lead 32. The interface unit 28 is also connected to the assembly 22 via a control lead 34 and power lead 36. The power lead 36 is also connected to a sensor assembly 38. The sensor assembly 38 receives the signal from the reflector optics and detector assembly 20 via lead 40.

Figure 3:
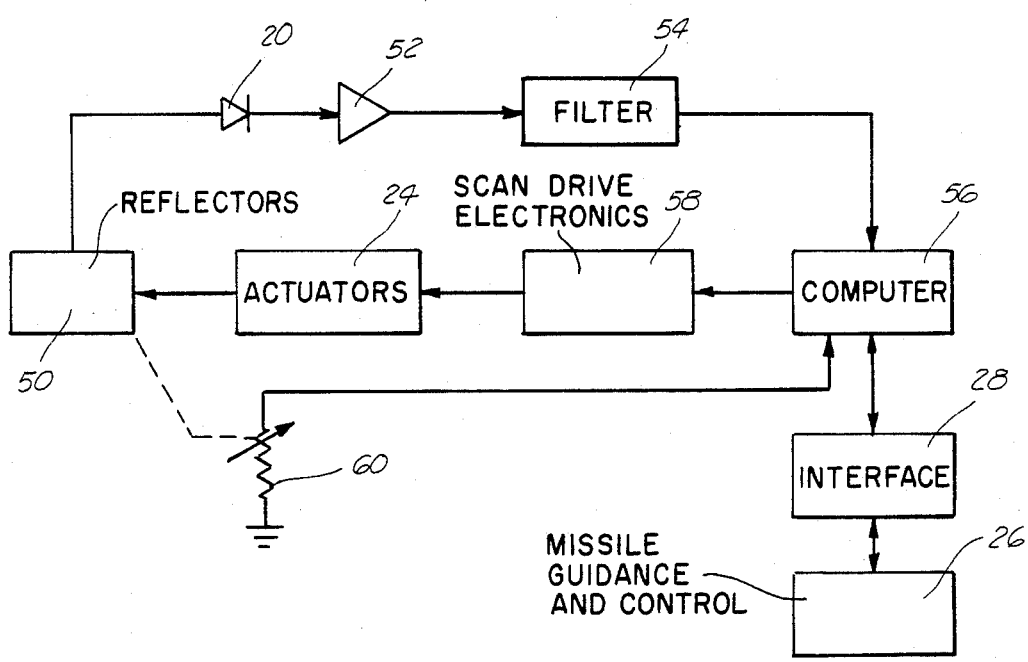
FIG. 3 illustrates the reflector with linear drive actuators.

In FIG. 3 a more detailed view of the dome 12 can be seen with the secondary reflector 16 and the primary reflector 14 controlled by a pair of linear actuators 24. It should be noted that it is essential for the scanning device 10 to operate properly, the target energy must remain focused on the detector 20 even when the movble elements of the reflectors are tilted off axis.

In FIG. 4 the dome 12 acts as a lens in passing both the on-axis rays 42 and off-axis rays 44 to the primary reflector 14. The target energy is then reflected from the primary reflector 14 which may be tilted in a position indicated by numeral 46 or 48 to the secondary reflector 16 and concentrated onto the detector 20. In this illustration, the dome 12 has spherical or aspherical surfaces with the primary reflectors 14 being spherical or aspherical and the secondary reflector 16 being aspherical although other shapes may be used for the dome and reflectors and accomplish the same results.

In FIG. 5 computer control of the scanning device 10 is shown. Energy is collected by the reflectors indicated by the box 50 and focused onto the detector 20. The signal is amplified by amplifier 52 and filtered by a filter 54 and sent to a microcomputer 56. The microcomputer 56 calculates the position errors which are then relayed to scan drive electronics 58 which energizes the control actuators 24 to enable movement of the movable primary reflector 14. Position of the movable optics is determined by potentiometers 60 and fed back to the microprocessor 56 which relays the target position data through the interface 28 to the guidance and control system of the missile 26. Gyro, rate sensor or other similar data is sent from the transducers located in missile guidance and control system 26 through the interface 28 to the computer 56 where the data is used in the calculations of total optical position errors before the control commands are sent to the scan drive optics 58.

To enable off center angles to be used in the seeker means, offset blue circle growth is provided. In FIG. 8, a tertiary reflector 66 is shown disposed behind the opening 18 of the reflector 14 and represents an alternate embodiment of the device 10. FIG. 9 illustrates a movable detector 20 while FIG. 10 illustrates the detector 20 with movable fiber optics 68.

The above described arrangement provides for a highy flexible control of the seeker device 10 and scan patterns as illustrated in FIGS. 6 and 7. In FIG. 6, a spiral search pattern is shown and represented by numerals 62. In FIG. 7 a spoke wagonwheel pattern 64 is illustrated. It should be noted that there are limitless scan patterns that are possible such as rasters, rosettes and different types of spirals and in general any regular 2-D pattern. The practical benefit and the flexibility of the device 10 optimizes the various types of scan patterns thereby enhancing the military usefulness of its missiles with major advantages for countermeasure avoidance.

Changes may be made in the construction and arrangement of the parts or elements of the embodiments as described herein without departing from the spirit or scope of the invention defined in the following claims.

What is claimed is:

1. An optical scanning device for a missile and the like, said device comprising:
    a primary reflector movably mounted on said missile and disposed for receiving a target signal;
    a secondary reflector mounted on said missile and disposed to receive a signal from said primary reflector;
    means fixed to said missile for selectively moving said primary reflector relative to said secondary reflector;
    detector means mounted on said missile for receiving a signal from said secondary reflector; and
    electronic means mounted in said missile for controlling said moving means to selectively generate a plurality of scanning patterns and controlling said missile to selectively track a target.

2. The scanning device of claim 1 wherein said moving means includes at least two electrodynamic actuators mounted on said missile, each said actuator including a control rod fixed to said primary reflector such that selective linear movement of each said control rod generates a desired scanning pattern.

3. The scanning device of claim 1 wherein said primary reflector includes an opening disposed for passage of the signal from said secondary reflector and wherein said detector means is operatively aligned with said opening for receiving the signal from said secondary reflector.

* * * * *

UNITED STATES PATENT AND TRADEMARK OFFICE
CERTIFICATE OF CORRECTION

PATENT NO. : 4,656,349
DATED : April 7, 1987
INVENTOR(S) : George T. Pinson et al.

It is certified that error appears in the above-identified patent and that said Letters Patent is hereby corrected as shown below:

Col. 2, line 58, change "accelometer" to --accelerometer--; and
Col. 3, line 3, change "accelometer" to --accelerometer--.

Signed and Sealed this

Eleventh Day of August, 1987

Attest:

DONALD J. QUIGG

Attesting Officer

Commissioner of Patents and Trademarks